(12) United States Patent
Guhya

(10) Patent No.: US 12,314,899 B2
(45) Date of Patent: May 27, 2025

(54) DRONE-BASED INVENTORY MANAGEMENT METHODS AND SYSTEMS

(71) Applicant: eMeasurematics Inc., Chicago, IL (US)

(72) Inventor: Mudrad Guhya, Chicago, IL (US)

(73) Assignee: eMeasurematics Inc., Chicago, IL (US)

( * ) Notice: Subject to any disclaimer, the term of this patent is extended or adjusted under 35 U.S.C. 154(b) by 0 days.

(21) Appl. No.: 18/127,171

(22) Filed: Mar. 28, 2023

(65) Prior Publication Data

US 2023/0237430 A1 Jul. 27, 2023

Related U.S. Application Data

(63) Continuation of application No. 17/170,004, filed on Feb. 8, 2021, now Pat. No. 11,620,613.

(Continued)

(51) Int. Cl.
| | |
|---|---|
| *G06Q 10/08* | (2024.01) |
| *G01W 1/02* | (2006.01) |
| *G05D 1/00* | (2006.01) |
| *G05D 1/10* | (2006.01) |
| *G06Q 10/0631* | (2023.01) |
| *G06Q 10/087* | (2023.01) |

(Continued)

(52) U.S. Cl.
CPC ............ *G06Q 10/087* (2013.01); *G01W 1/02* (2013.01); *G05D 1/0094* (2013.01); *G05D 1/1062* (2019.05); *G06Q 10/06315* (2013.01); *G06T 7/001* (2013.01); *G06T 7/174* (2017.01); *G06T 7/62* (2017.01); *G06T 7/70* (2017.01); *H04N 23/90* (2023.01); *B64F 1/362* (2013.01); *B64U 10/14* (2023.01); *B64U 80/25* (2023.01); *B64U 2101/30* (2023.01); *B64U 2101/70* (2023.01); *B64U 2201/10* (2023.01); *G06T 2207/10032* (2013.01); *G06T 2207/30136* (2013.01)

(58) Field of Classification Search
CPC ......... G06Q 10/087; G06T 7/62; G06T 7/174; G06T 7/70; G05D 1/1062
USPC .......................................................... 348/117
See application file for complete search history.

(56) References Cited

U.S. PATENT DOCUMENTS

| | | |
|---|---|---|
| 9,280,757 B2 | 3/2016 | Parpia et al. |
| 9,477,938 B1 | 10/2016 | Russell et al. |

(Continued)

FOREIGN PATENT DOCUMENTS

WO 2018011792 A1 1/2018

*Primary Examiner* — Jeffery A Williams
(74) *Attorney, Agent, or Firm* — Michael Best & Friedrich LLP

(57) ABSTRACT

Drone-based inventory management method and systems. One embodiment provides a drone-based inventory management system including one or more unmanned aerial vehicles (UAVs), and a central management system having an electronic processor, and a transceiver configured to communicate with the one or more UAVs. The electronic processor is configured to determine a discrepancy in inventory and select a UAV for verification. The electronic processor is also configured to determine whether weather permits UAV operation and operate the UAV in a predetermined route when the weather permits UAV operation. The electronic processor is further configured to capture images using the UAV and determine new inventory based on captured images. The electronic processor is also configured to update inventory based on the new inventory.

12 Claims, 11 Drawing Sheets

Related U.S. Application Data

(60) Provisional application No. 62/971,470, filed on Feb. 7, 2020.

(51) Int. Cl.
  *G06T 7/00* (2017.01)
  *G06T 7/174* (2017.01)
  *G06T 7/62* (2017.01)
  *G06T 7/70* (2017.01)
  *H04N 23/90* (2023.01)
  *B64F 1/36* (2017.01)
  *B64U 10/14* (2023.01)
  *B64U 80/25* (2023.01)
  *B64U 101/30* (2023.01)
  *B64U 101/70* (2023.01)

(56) References Cited

U.S. PATENT DOCUMENTS

| | | |
|---|---|---|
| 9,533,759 B2 | 1/2017 | Jones et al. |
| 9,747,808 B2 | 8/2017 | Chambers et al. |
| 9,827,683 B1 | 11/2017 | Hance et al. |
| 10,002,416 B2 | 6/2018 | Mannar et al. |
| 10,187,616 B2 | 1/2019 | Shondel |
| 2015/0120094 A1* | 4/2015 | Kimchi ............... G06Q 10/083 701/3 |
| 2016/0214715 A1 | 7/2016 | Meffert |
| 2017/0160735 A1 | 6/2017 | Mikan et al. |
| 2017/0364828 A1* | 12/2017 | Bennett .................... E04H 4/06 |
| 2018/0327091 A1 | 11/2018 | Burks et al. |
| 2020/0111053 A1* | 4/2020 | Bogolea ................. G06V 20/10 |
| 2021/0216948 A1* | 7/2021 | Foina ................... H04W 4/029 |

* cited by examiner

DRONE-BASED INVENTORY MANAGEMENT METHODS AND SYSTEMS

RELATED APPLICATIONS

The present application is a continuation of U.S. application Ser. No. 17/170,004, filed on Feb. 8, 2021, which claims the benefit of U.S. Provisional Patent Application No. 62/971,470, filed on Feb. 7, 2020, the entire contents of each of which are fully incorporated herein by reference.

FIELD OF THE INVENTION

The present application relates to drone-based inventory management systems and methods, for example, in a steel-making plant.

DETAILED DESCRIPTION

Figure 1:
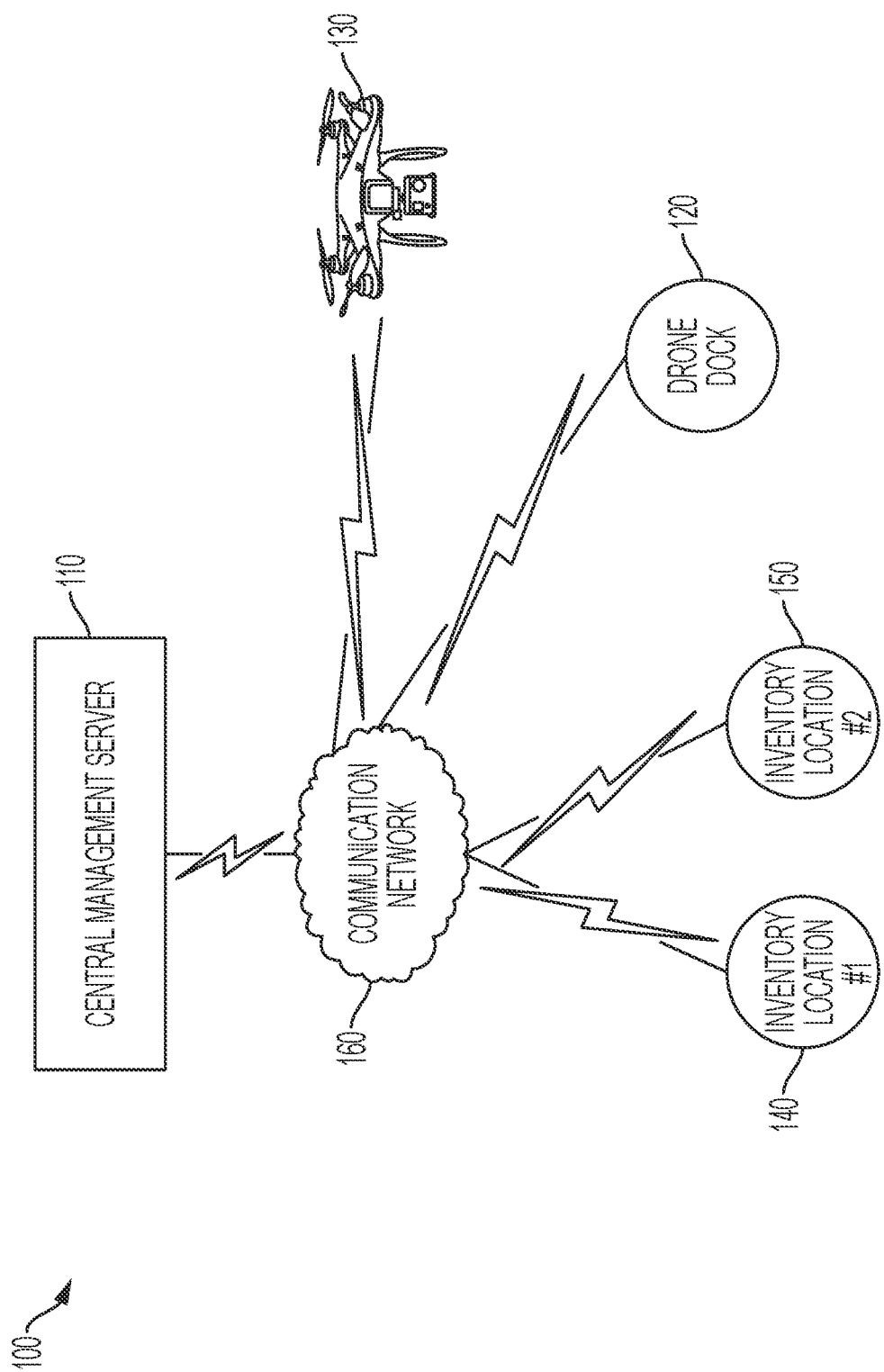
FIG. 1 is a block diagram of a drone-based inventory management system in accordance with some embodiments.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

It should be understood that although certain drawings illustrate hardware and software located within particular devices, these depictions are for illustrative purposes only. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

In most steel-making plants, steel finished products are manufactured according to buyer specifications providing for a specific composition and type. Steel finished products may be produced in slabs, sheets, rolls, and the like and are transported within the steel-making plant between various locations. For example, steel inventory may be transported from the manufacturing facility to a warehouse lot or an outdoor lot and from the warehouse lot or the outdoor lot to a rail yard where the inventory is loaded onto transport vehicles for delivery to buyers. Inventory may be transported between various locations using manually-operated, semi-autonomous, and autonomous vehicles.

Inventory is stamped or embedded with identification information after manufacturing. The identification information is used to track inventory between the different locations within the steel-making plant. Typically, inventory is manually tracked by employees of the steel-making plant. The employees scan the inventory and manually enter the information regarding the location of the inventory into an inventory management system. However, there is no independent means to verify location of pick-ups and drop-offs of inventory and the number of inventory handled.

Currently verification and inventory management systems include indirect methods such as Global Positioning System (GPS) positioning, sensor based positioning systems (for example, equipment moving steel is equipped with X, Y, and Z co-ordinate location system, within buildings or outside open yards), weight measurements, and operator input. However, these are prone to operator error and/or equipment failure and may not provide accurate methods to track inventory. Small errors may propagate and contaminate the rest of the inventory data leading to diminished certainty or overall inventory tracking failure.

Accordingly, there is a need for an accurate inventory management system that automatically tracks inventory across various locations and provides avenues for automatically resolving discrepancies.

One embodiment provides a drone-based inventory management system including a drone, and a central management system having an electronic processor, and a transceiver configured to communicate with the drone. The electronic processor is configured to determine a discrepancy in inventory and select a drone for verification. The electronic processor is also configured to determine whether weather permits drone operation and operate the drone in a pre-determined route when the weather permits drone operation. The electronic processor is further configured to capture images using the drone and determining new inventory based on captured images. The electronic processor is also configured to update inventory based on the new inventory.

Another embodiment provides a method for inventory discrepancy drone dispatch. The method includes determining, using a central management server, a discrepancy in inventory and selecting, using the central management server, a drone for verification. The method also includes determining, using the central management server, whether weather permits drone operation and operating, using the central management server, the drone in a pre-determined route when the weather permits drone operation. The method further includes capturing images using the drone and determining, using the central management server, new inventory based on captured images. The method also includes updating, using the central management server, inventory based on the new inventory.

Another embodiment provides a drone-based inventory management system including a drone, and a central management system having an electronic processor, and a transceiver configured to communicate with the drone. The electronic processor is configured to determine an area for inventory tracking and select a drone for verification based on the area. The electronic processor is also configured to determine whether weather permits drone operation and operate the drone in a pre-determined route when the weather permits drone operation. The electronic processor is further configured to capture images using the drone and segment images based on locations in the area. The electronic processor is also configured to measure height or volume changes of inventory at each location and determining change in inventory based on height or volume changes. The electronic processor is further configured to update inventory based on the change in inventory.

Another embodiment provides a method for inventory discrepancy drone dispatch. The method includes determining, using a central management server, an area for inventory tracking and selecting, using the central management server, a drone for verification based on the area. The method also includes determining, using the central management server, whether weather permits drone operation and operating, using the central management server, the drone in a pre-determined route when the weather permits drone operation. The method further includes capturing images using the drone and segmenting, using the central management server, images based on locations in the area. The method also includes measuring height or volume changes of inventory at each location and determining, using the central management server, change in inventory based on height or volume changes. The method also includes updating, using the central management server, inventory based on the change in inventory.

Another embodiment provides a drone-based inventory management system including a drone, and a central management system having an electronic processor, and a transceiver configured to communicate with the drone. The electronic processor is configured to determine a last known location of a vehicle and select a drone for verification based on the last known location. The electronic processor is also configured to determine whether weather permits drone operation and operate the drone in a pre-determined route to the last known location when the weather permits drone operation. The electronic processor is further configured to operate drone from the last known location in an expected route of vehicle and dock onto the vehicle in response to detecting the vehicle. The drone provides the missing functionality to a vehicle console of the vehicle.

Another embodiment provides a method for inventory discrepancy drone dispatch. The method includes determining, using a central management server, a last known location of a vehicle and selecting, using the central management server, a drone for verification based on the last known location. The method also includes determining, using the central management server, whether weather permits drone operation and operating, using the central management server, the drone in a pre-determined route to the last known location when the weather permits drone operation. The method further includes operating the drone from the last known location in an expected route of the vehicle and docking on to the vehicle in response to detecting the vehicle. The method also includes providing, using the drone, missing functionality to a vehicle console of the vehicle.

Although an example of a steel-making plant is provided, one of ordinary skill in the art will appreciate that the below description is equally applicable in other industrial plants where accurate inventory management is desired.

FIG. 1 is a simplified block diagram of a drone-based inventory management system 100. In the example illustrated, the drone-based inventory management system 100 includes a central management server 110, a drone dock 120, one or more drones 130 (singularly referred to as drone 130), a first inventory location 140, and a second inventory location 150. FIG. 1 illustrates two inventory locations 140 and 150, however, one of ordinary skill in the art would appreciate that the drone-based inventory management system 100 may be expanded to cover any number of inventory locations. The central management server 110, the drone dock 120, the drone 130, the first inventory location 140, and the second inventory location 150 communication over a communication network 160.

Figure 2:
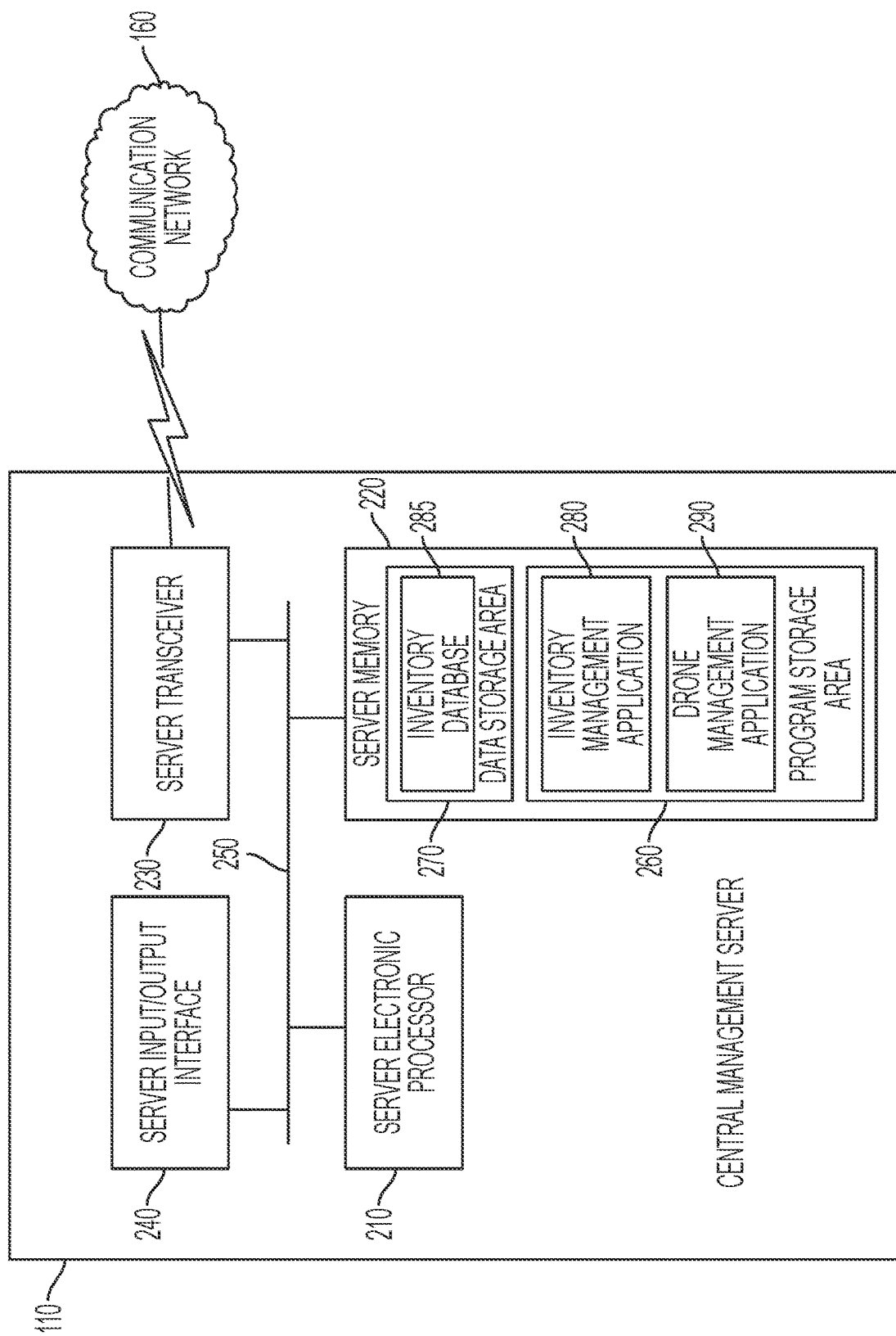
FIG. 2 is a block diagram of a central management server of the drone-based inventory management system of FIG. 1 in accordance with some embodiments.

The central management server 110 is a physical or cloud-based server that tracks the inventory of the industrial plant having the inventory management system 100. Referring to FIG. 2, the central management server 110 includes a server electronic processor 210, a server memory 220, a server transceiver 230, and a server input/output interface 240 communicating over one or more control and/or data buses (for example, a server communication bus 250). In some embodiments, the server electronic processor 210 is implemented as a microprocessor with separate memory, such as the server memory 220. In other embodiments, the server electronic processor 210 may be implemented as a microcontroller (with server memory 220 on the same chip). In other embodiments, the server electronic processor 210 may be implemented using multiple processors. In addition, the server electronic processor 210 may be implemented partially or entirely as, for example, a field-programmable gate array (FPGA), an application specific integrated circuit (ASIC), and the like and the server memory 220 may not be needed or be modified accordingly. In the example illustrated, the server memory 220 includes non-transitory, computer-readable memory that stores instructions that are received and executed by the server electronic processor 210 to carry out the functionality of the central management server 110 described herein. In some embodiments, the central management server 110 may include one server electronic processor 210 and/or a plurality of server electronic processors 210 in a cloud computer cluster arrangement, one or more of which may be executing none, all, or a portion of the applications of the central management server 110 provided below, sequentially or in parallel across the one or more server electronic processors 210. The one or more server electronic processor 210 comprising the central management server 110 may be geographically co-located or may be separated by inches, meters, kilometers or miles, and interconnected via electronic and/or optical interconnects. One or more proxy servers or load balancing server may control which one or more server electronic processors 210 perform any part or all the applications provided below.

The server memory 220 may include, for example, a program storage area 260 and a data storage area 270. The program storage area 260 and the data storage area 270 may include combinations of different types of memory, such as read-only memory and random-access memory. Similarly as the server electronic processor 210, the server memory 220 may be in a cloud cluster arrangement and may be geographically co-located or may be separated and interconnected via electronic and/or optical interconnects. In the example, the program storage area 260 includes an inventory management application 280 and a drone management application 290. The data storage area 270 includes an inventory database 285. The server electronic processor 210 executes the inventory management application 280 to log and track inventory in the inventory database 285. The server electronic processor 210 executes the drone management application 290 to control drone operation and to update the inventory database 285 using drone dispatch methods as further described below.

The server transceiver 230 enables wired and/or wireless communication between the central management server 110 and the drone dock 120, the drone 130, the first inventory location 140 and the second inventory location 150 over the communication network 160. In some embodiments, the server transceiver 230 may comprise separate transmitting and receiving components, for example, a transmitter and a receiver. The server input/output interface 240 may include one or more input mechanisms (for example, a touch pad, a keypad, and the like), one or more output mechanisms (for example, a display, a speaker, and the like), or a combination thereof, or a combined input and output mechanism such as a touch screen.

In the example illustrated in FIG. 2, a single device is illustrated as including all components and the applications of the central management server 110. However, it should be understood that one or more of the components and one or more of the applications may be combined or divided into separate software, firmware, and/or hardware. Regardless of how they are combined or divided, these components and applications may be executed on the same computing device or may be distributed among different computing devices connected by one or more networks or other suitable communication means. In one example, all the components and applications of the central management server 110 are implemented in a cloud infrastructure accessible through several terminal devices, with the processor power located at a server location.

Figure 3:
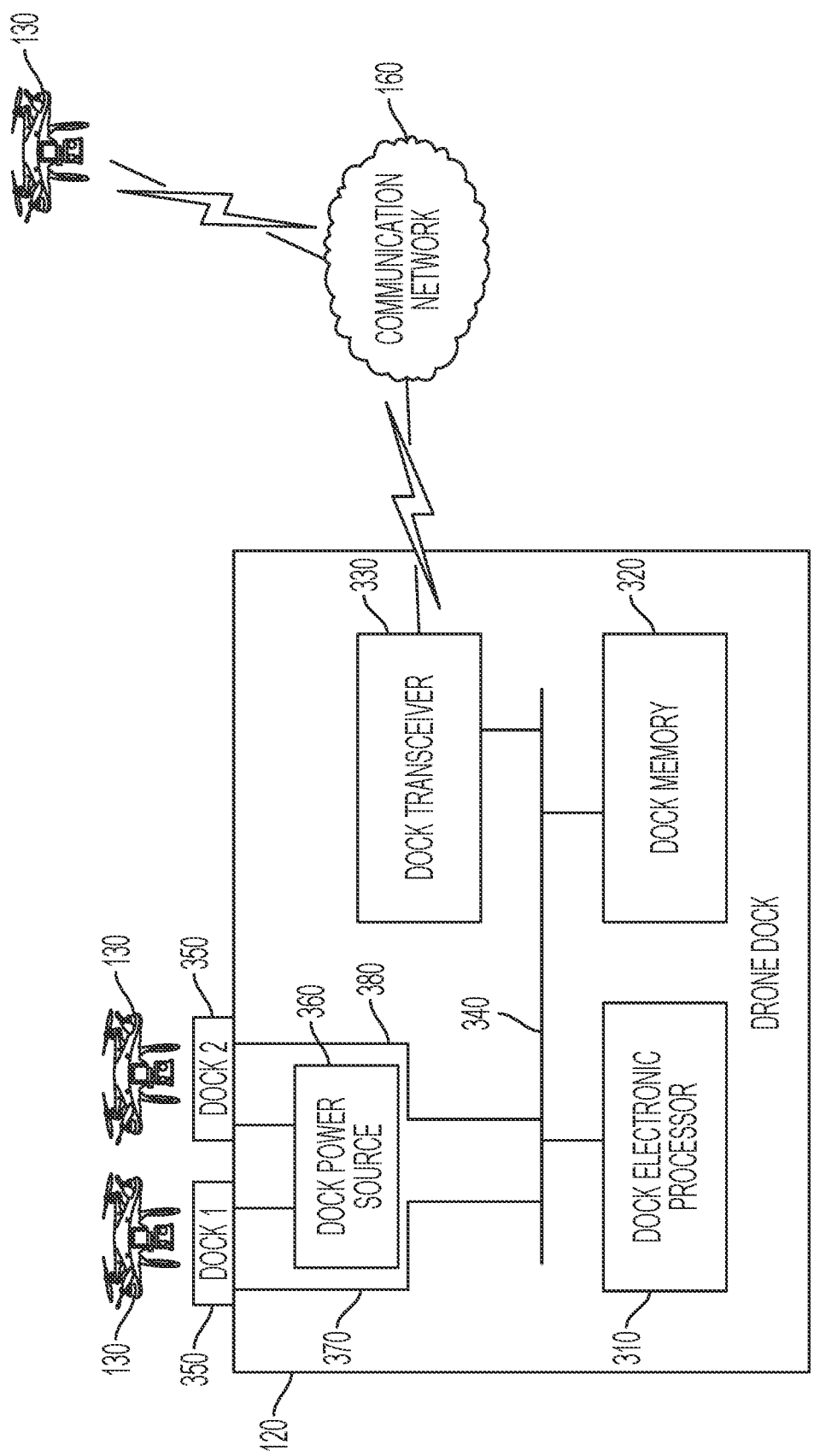
FIG. 3 is a block diagram of a drone dock of the drone-based inventory management system of FIG. 1 in accordance with some embodiments.

FIG. 3 is a simplified block diagram of the drone dock 120. In the example illustrated, the drone dock 120 includes a dock electronic processor 310, a dock memory 320, and a dock transceiver 330 that communication over one or more control and/or data buses (for example, a dock communication bus 340). The dock electronic processor 310, the dock memory 320, and the dock transceiver 330 may be implemented similar to the server electronic processor 210, the server memory 220, and the server transceiver 230 respectively as described above. The dock transceiver 330 enables wired and/or wireless communication between the drone dock 120 and the communication network 160.

The drone dock 120 includes one or more docks 350 to receiver one or more drones 130. The docks 350 include a physical coupling and an electrical coupling to physically and electrically couple to the drones 130. The drone dock 120 includes a dock power source 360 and power from the dock power source 360 is routed to the docks 350 to provide charging current to the drones 130. Communication lines 370 are also provided to route control and/or data signals between the drones 130 and the dock communication bus 340. The drone dock 120 provides control instructions, firmware updates, and other communication through the communication lines 370 to the drones 130.

Figure 4:
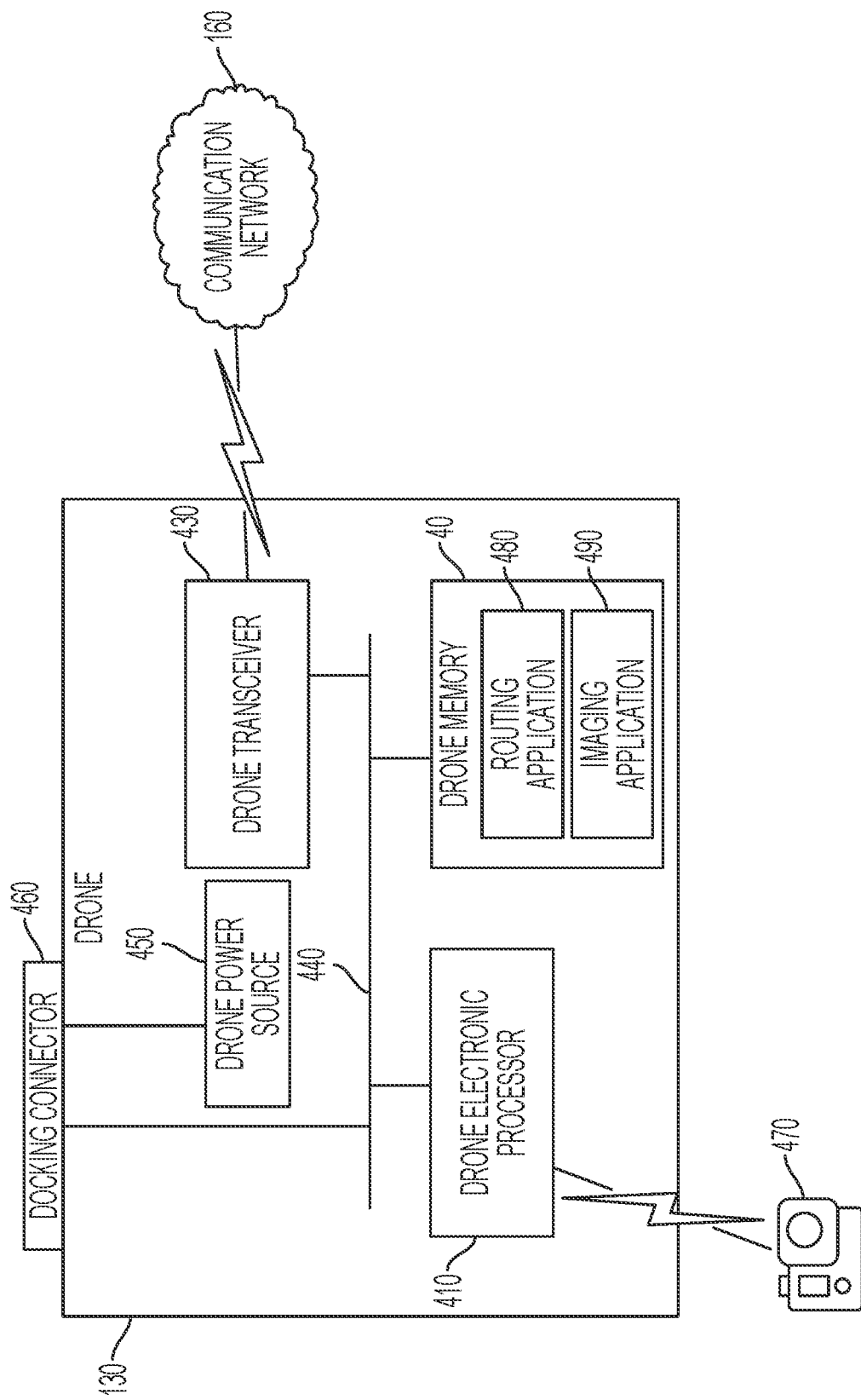
FIG. 4 is a block diagram of a drone of the drone-based inventory management system of FIG. 1 in accordance with some embodiments.

FIG. 4 is a simplified block diagram of a drone 130. The term "drone" as used herein includes any kind of unmanned aerial vehicles (UAVs) that may be remotely controlled or that may be autonomously operated. In the example illustrated, the drone 130 includes a drone electronic processor 410, a drone memory 420, and a drone transceiver 430 communicating over one or more control and/or data buses (for example, a drone communication bus 440). The drone electronic processor 410, the drone memory 420, and the drone transceiver 430 may be implemented similar to the server electronic processor 210, the server memory 220, and the server transceiver 230 respectively as described above.

The drone transceiver 430 enables wired and/or wireless communication between the drone 130 and the communication network 160.

The drone 130 also includes a drone power source 450, a docking connector 460, and an imaging device 470. The drone power source 450 is, for example, a lithium-ion battery that powers the drone 130 for operation. The docking connector 460 includes a physical and an electrical connector to couple to a dock 350 of the drone dock 120. The drone 130 may receive charging current to charge the drone power source 450 from the drone dock 120 through the docking connector 460. The imaging device 470 is, for example, a bar code scanner, an RFID scanner, or a camera that captures identification data stamped or embedded in the inventory.

The drone memory 420 may store several applications that are executed by the drone electronic processor 410 to implement the functionality of the drone 130. For example, the drone memory 420 includes a routing application 480 and an image capturing application 490. The drone electronic processor 410 may execute the routing application 480 to determine a current location of the drone 130, to operate the drone 130 in a pre-planned route provided by the central management server 110, and the like. The drone electronic processor 410 may execute the image capturing application 490 to operate the imaging device 470 to capture images, moving images (i.e., videos), or other data.

Referring to FIGS. 5A-6B, the first inventory location 140 is, for example, an indoor warehouse area and the second inventory location 150 is, for example, an outdoor storage area. The indoor warehouse area and the outdoor storage area are divided into several lots, which may be numbered. Each area and each lot may be identified by corresponding identification data in the inventory database 285. Additionally, each lot may include certain electronic devices, for example, beacons, identification markers, image capturing devices, communication devices, and the like. Beacons may include, for example, radio frequency identification devices that emit identification information. Identification markers may include stamped data identifying the lot. Image capturing devices may include cameras to capture images of each lot or vehicles entering and exiting the lots. Communication devices include routers, repeaters, and the like that communicate with vehicles, drones 130, and the like and provide interaction information to the central management sever 110 through the communication network 160. The central management server 110 communicates with the electronic devices provided in the first inventory location 140 and the second inventory location 150 when the central management server 110 is communicating with the first inventory location 140 and the second inventory location 150.

Figure 7:
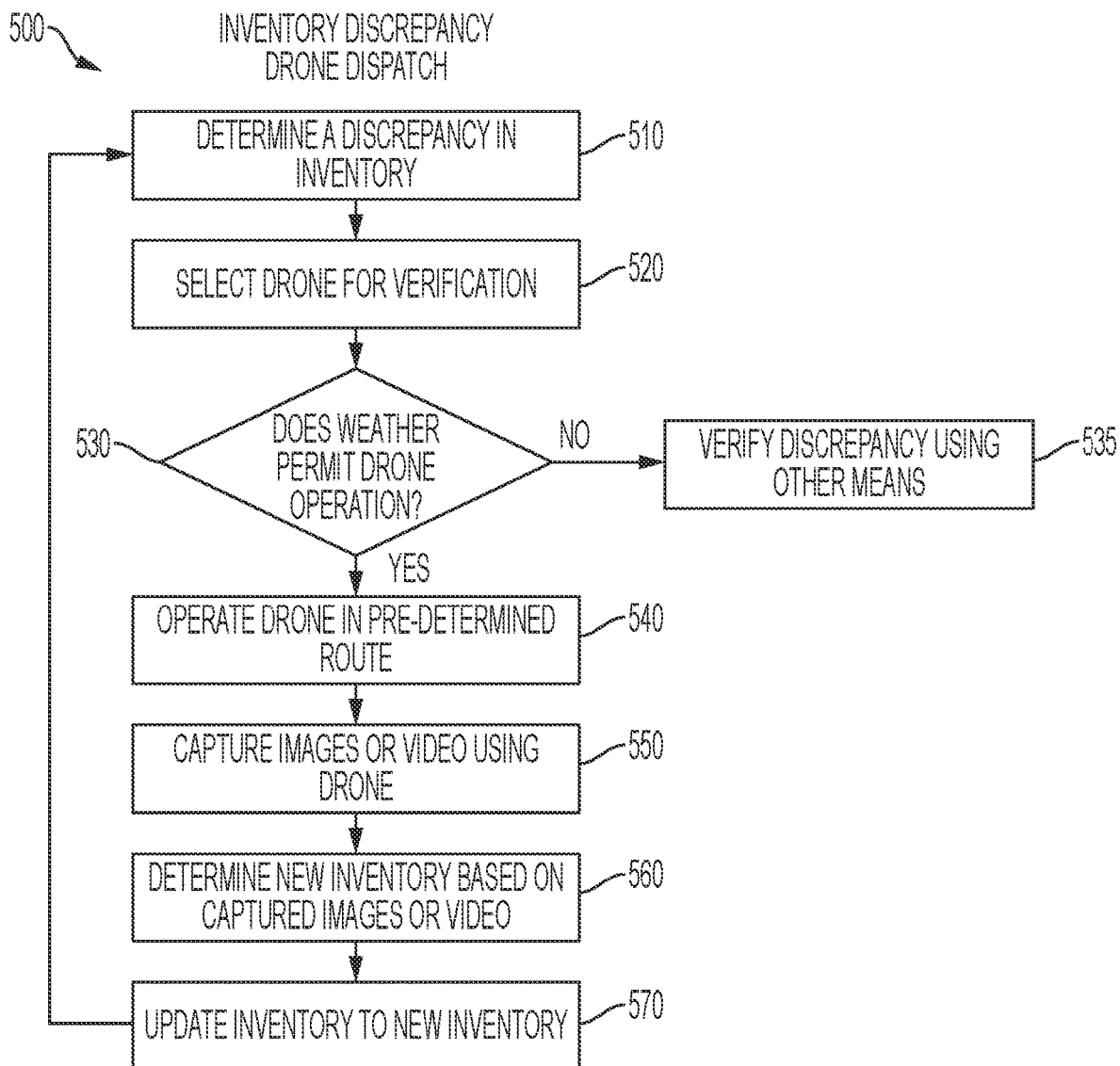
FIG. 7 is a flowchart of a method for inventory discrepancy drone dispatch in accordance with some embodiments.

FIG. 7 illustrates a flowchart of an example method 500 for inventory discrepancy drone dispatch. In the example illustrated, the method 500 includes determining a discrepancy in the inventory (at block 510). A discrepancy occurs, for example, when an inventory item is misplaced or cannot be located. The central management server 110 may detect a discrepancy in the inventory in various ways. For example, the central management server 110 may detect a discrepancy based on user input of a vehicle operator or a data logger.

The method 500 includes selecting a drone 130 for verification (at block 520). The central management server 110 may select a drone 130 from the drone dock 120 based on several factors. In one example, the central management server 110 selects a drone 130 having sufficient battery charge to complete the operation. In another example, the central management server 110 may pre-configure certain drones 130 for specific operations and may select a drone 130 that is configured for inventory discrepancy verification operation. In some embodiments, the steel-making plant may have several drone docks 120 and the central management server 110 may select a drone 130 from a drone dock 120 that is closes to a location with the inventory discrepancy. The central management server 110 selects and dispatches a drone 130 in response to determining a discrepancy in the inventory.

The method 500 includes determining whether the weather permits drone operation (at block 530). The steel-making plant may include a weather station that can acquire information regarding the current and future weather conditions at the steel-making plant. The weather conditions may include temperature, precipitation levels, wind conditions, wind direction, and the like. The weather station may provide periodic updates to the central management server 110 regarding the weather conditions. Based on the periodic updates, the central management server 110 determines whether a drone 130 may be safely operated in the current weather conditions. When the weather conditions are not favorable for drone operation, the central management server 110 may use other means for correcting the inventory discrepancy or may suspend the drone operation until the weather conditions are favorable again (at block 535). Unfavorable weather conditions include, for example, wind speeds above certain thresholds (e.g., above 40 miles per hour), precipitation over certain thresholds (e.g., over 5 inches), storm conditions (e.g., winter storm conditions, hurricane conditions, and the like), etc.

When the weather conditions are favorable for drone operation, the method 500 includes operating the drone 130 in a pre-determined route (at block 540). The central management server 110 may select a pre-determined or pre-planned route for the discrepancy verification. When a location of an inventory item needs to be verified, the central management server 110 may provide a route between the drone dock 120 and the last known inventory location. When an inventory item is misplaced, the central management server 110 may provide a route between the drone dock 120 and a location where the inventory item was recently placed. The inventory location may be specific lot in one of the first inventory location 140 and the second inventory location 150. In some embodiments, the central management server 110 may provide route guidance for the drone 130 to be operated to different locations where an inventory item may be expected to be. The pre-determined route may be the shortest distance between the drone dock 120 and the inventory location. Specifically, markers may be provided on the ground to mark a path (e.g., road lane markers). The pre-determined route may include a route that follows the ground markers from closest to the drone dock 120 to closest to the inventory location. The pre-determined route may also include indications of where to perform turns based on ground markers and which portions of the industrial plant to avoid.

Figure 5A:
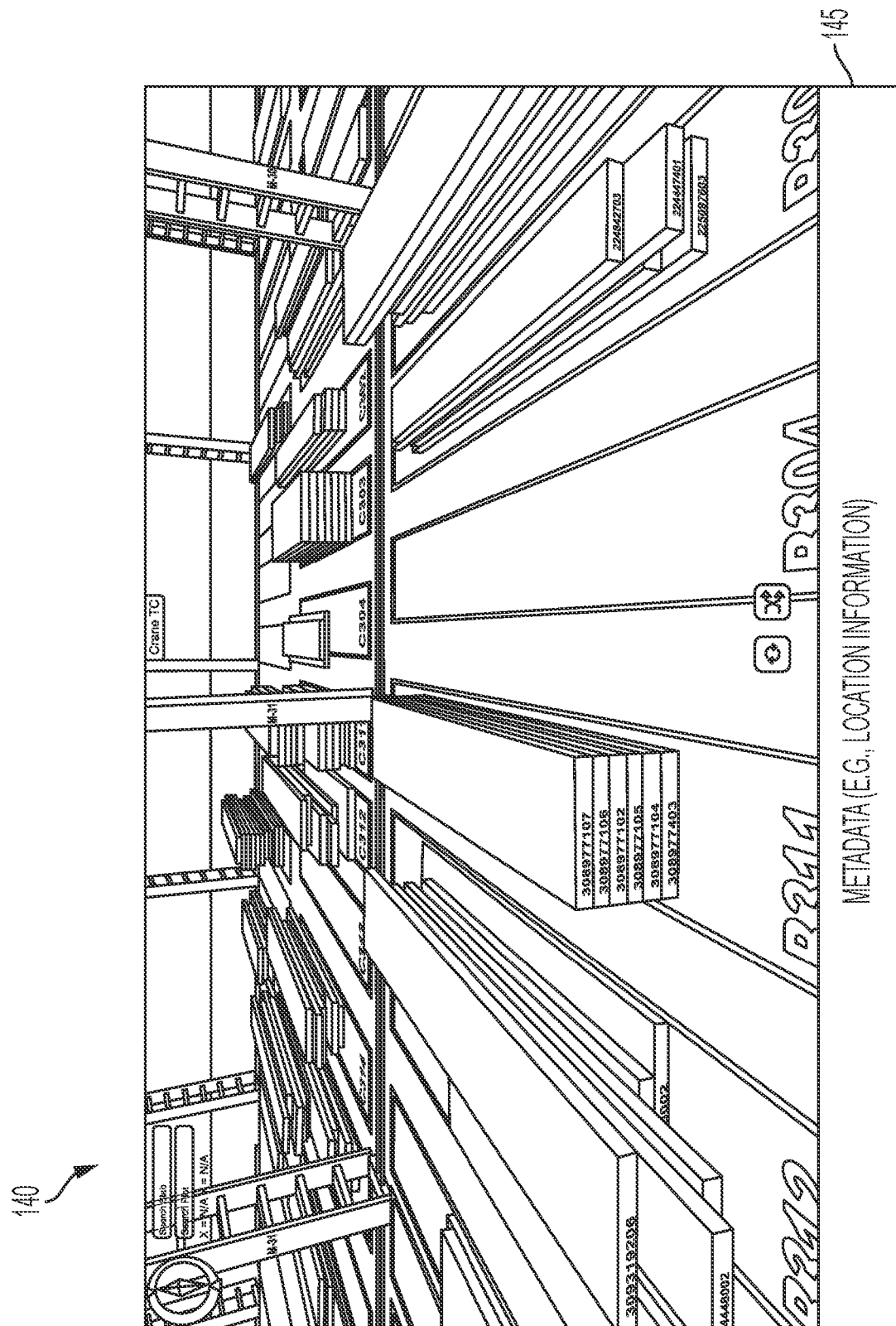
FIGS. 5A-B illustrates an inventory location of FIG. 1 in accordance with some embodiments.
Figure 5B:
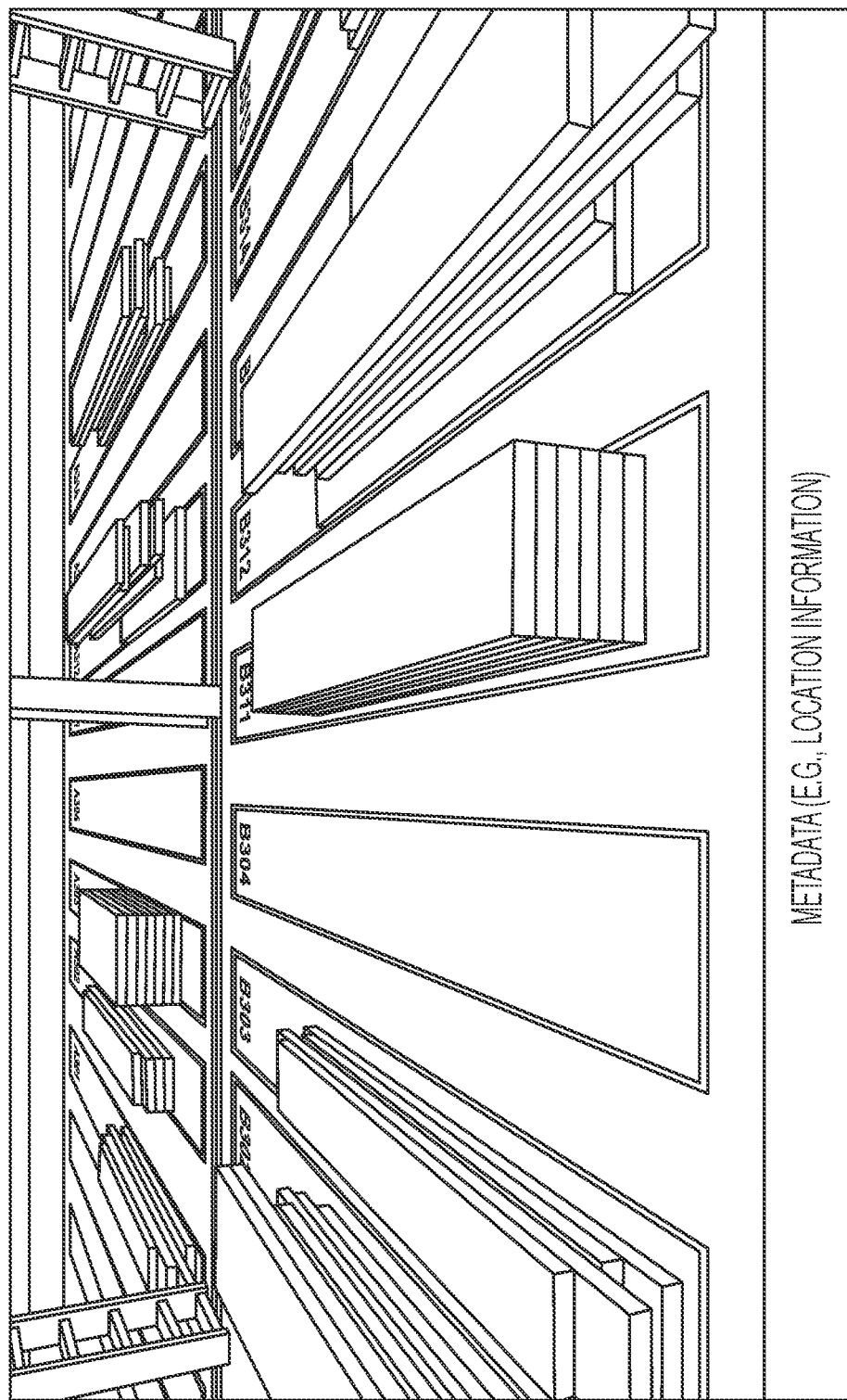
Figure 6A:
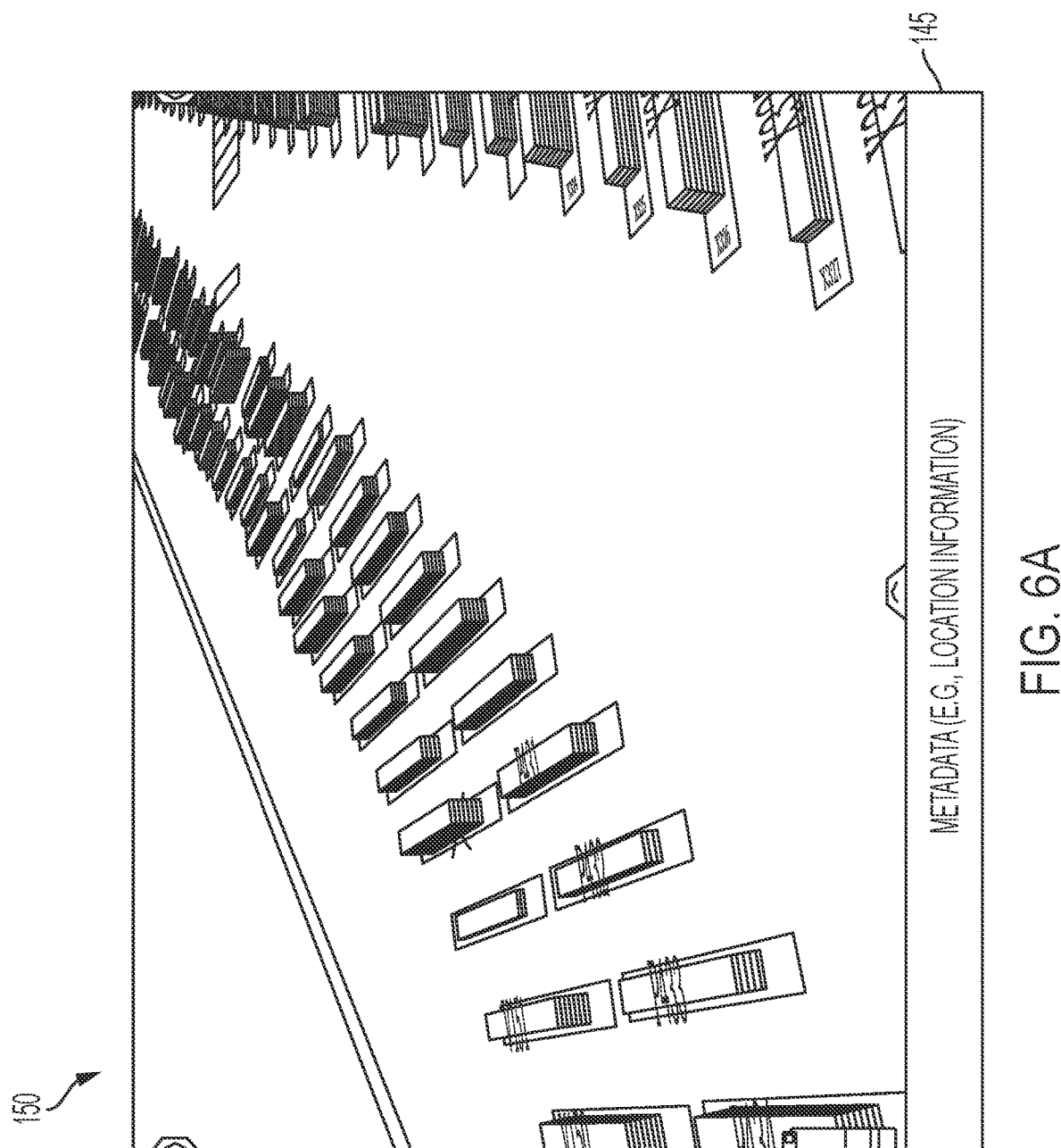
FIGS. 6A-B illustrates an inventory location of FIG. 2 in accordance with some embodiments.
Figure 6B:
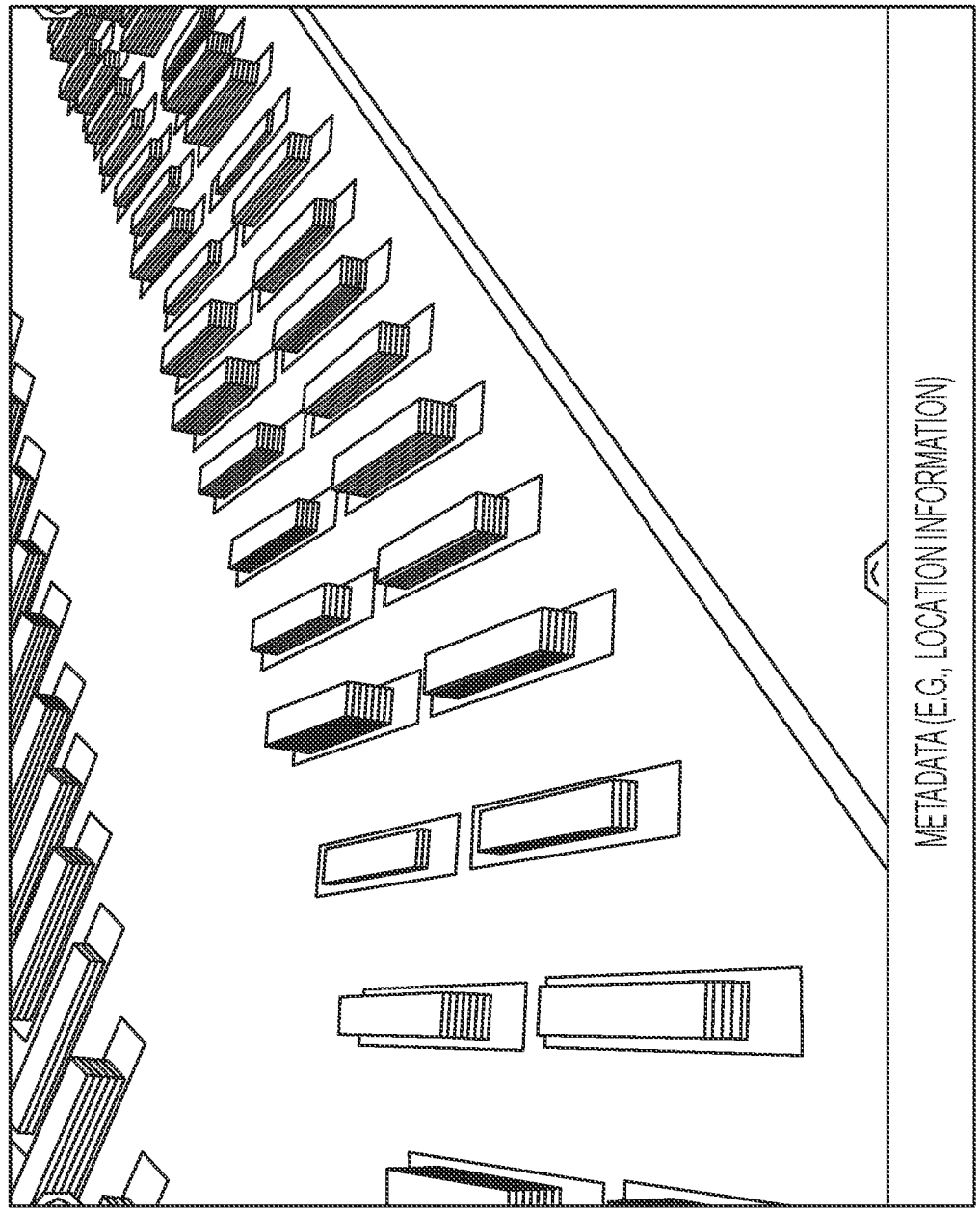

The method 500 includes capturing images using the drone 130 (at block 550). The drone 130 uses the imaging device 470 to capture images of one or more inventory locations. The drone 130 may capture images or data at different angles of the same location in order to ensure capturing of all relevant data. For example, the drone 130 may be operated to capture 360 degrees of an inventory lot or location. As shown in FIGS. 5A and 5B, the drone 130 may capture images of an inventory location 140 180 degrees apart. Similarly, as shown in FIGS. 6A and 6B, the drone 130 may capture an images of an inventory location 150 180 degrees apart.

The method 500 includes determining new inventory based on captured images (at block 560). The central management server 110 acquires the images from the drone 130, for example, over the communication network 160 when the drone 130 is still at the inventory location or when the drone 130 is docked at the drone dock 120 after completing the image capture. The central management server 110 uses image processing techniques to process the images and identify the location and the inventory of items present at the location. The central management server 110 may extract identification information from the images captured by the drone 130. The central management server 110 may therefore identify the present location of an inventory item or may identify that a location does not have the inventory item based on the images captured by the drone 130.

The method 500 includes updating inventory to new inventory (at block 570). The central management server 110 resolves the discrepancy identified in the inventory database 285 using the images captured by the drone 130 as described above. The central management server 110 updates the inventory database 285 based on the new information received from processing the images captured by the drone 130.

Figure 8:
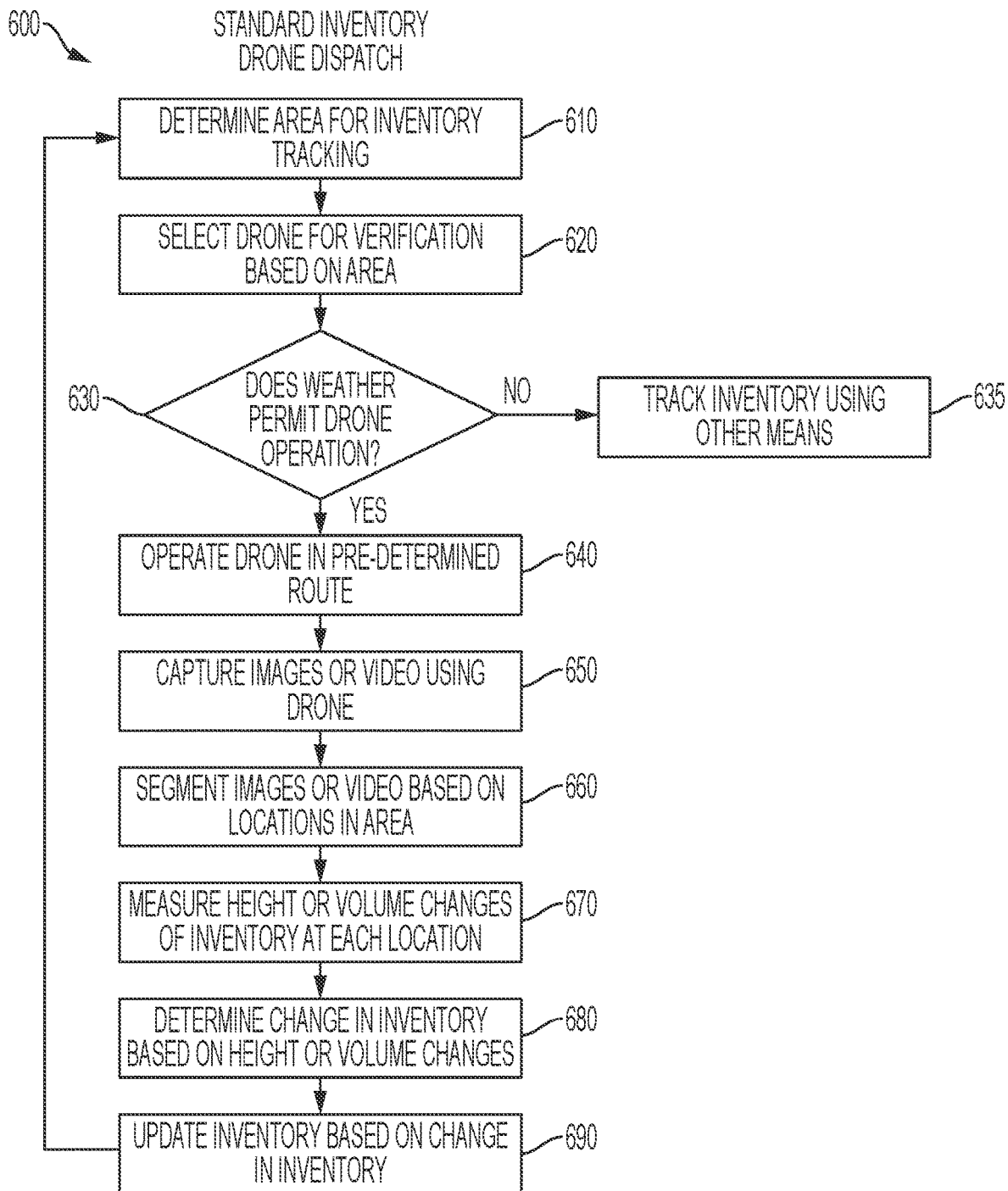
FIG. 8 is a flowchart of a method for standard inventory drone dispatch in accordance with some embodiments.

FIG. 8 illustrates a flowchart of an example method 600 for standard or bulk inventory drone dispatch. In the example illustrated, the method 600 includes determining an area for inventory tracking (at block 610). Steel-making plants may be divided into several areas, for example, a warehouse area, an outdoor storage area, a loading area, an unloading area, and the like. Vehicles may pick-up and drop-off inventory from a location and/or a lot within an area in the steel-making plant. Drones 130 may be dispatched to determine a standard or bulk inventory of a whole area, for example, the first inventory location 140, the second inventory location 150, and the like. The standard or a bulk inventory may be obtained after on a change (for example, a pick-up or drop-off) or at periodic intervals (for example, once a day, at the beginning of the day, at the end of the day, and/or the like).

The method 600 includes selecting a drone 130 for verification based on area (at block 620). The central management server 110 may select a drone 130 from the drone dock 120 based on several factors. In one example, the central management server 110 selects a drone 130 having sufficient battery charge to complete the operation. In another example, the central management server 110 may pre-configure certain drones 130 for specific operations and may select a drone 130 that is configured for determining a standard inventory of an area. In some embodiments, the steel-making plant may have several drone docks 120 and the central management server 110 may select a drone 130 from a drone dock 120 that is located in the area or close to the area.

The method 600 includes determining whether the weather permits drone operation (at block 630). When the weather conditions are not favorable for drone operation, the central management server 110 may use other means for correcting the inventory discrepancy or may suspend the drone operation until the weather conditions are favorable again (at block 635). When the weather conditions are favorable for drone operation, the method 600 includes operating the drone 130 in a pre-determined route (at block 640). The central management server 110 may select a pre-determined or pre-planned route for the determining standard inventory. The pre-determined route may include getting from the drone dock 120 to the area and also navigation within the area to capture images.

The method 600 includes capturing images using the drone 130 (at block 650). The drone 130 uses the imaging device 470 to capture images of some or all inventory locations in the area. The drone 130 may capture images or data at different angles of the same location in order to ensure capturing of all relevant data. In one example, the drone 130 is operated to capture 360 degrees of an inventory lot or location within the area. The method 600 includes segmenting images based on locations in area (at block 660). The central management server 110 may acquire the images from the drone 130 and add location tags to the images to correlate the images with the locations corresponding to the images. The central management server 110 may organize the images by location to determine inventory of each location. The drone 130 may add a location tag to each captured image and the central management server 110 may use the location tag to determine the location where the image was taken. The location tags are added, for example, in the metadata of the images. In the examples shown in FIGS. 5A-6B, the metadata 145 and 155 is provided with the images of the indoor inventory location 140 and the outdoor inventory location 150 respectively.

The method 600 includes measuring height or volume changes of inventory at each location (at block 670). In some embodiments, the drone 130 includes a radar measurement system to measure the amount of inventory present at a location. In other embodiments, the central management server 110 may determine the amount of inventory by analyzing the images captured by the drone 130. In one example, the central management server 110 uses image processing techniques to determine the size of the inventory items at the location. In some embodiments, the central management server 110 first determines a type of inventory item or steel in the image. For example, the inventory item may be a slab, a roll, a sheet, and the like. The central management system may determine the height or volume changes by correlating the measurements from the drone 130 to the type of the inventory item. For example, for a roll of steel, the central management server 110 requests that the drone 130 capture a diameter and width of the inventory item to determine the amount of steel in the roll. For a slab or sheet, the central management system 110 requests that the drone 130 capture a height, width, and/or length of the inventory item.

The method 600 includes determining change in inventory based on height or volume changes (at block 680). The central management server 110 may determine the changes in height or volume of inventory items by comparing the new height or volume with the previously recorded height or volume at the location, for example, during a previous standard inventory operation.

The method 600 includes updating inventory based on change in inventory (at block 690). The central management server 110 updates the inventory database 285 with the new inventory using the images captured by the drone 130 as described above. The central management server 110 updates the inventory database 285 based on the new information received from processing the images captured by the drone 130.

Figure 9:
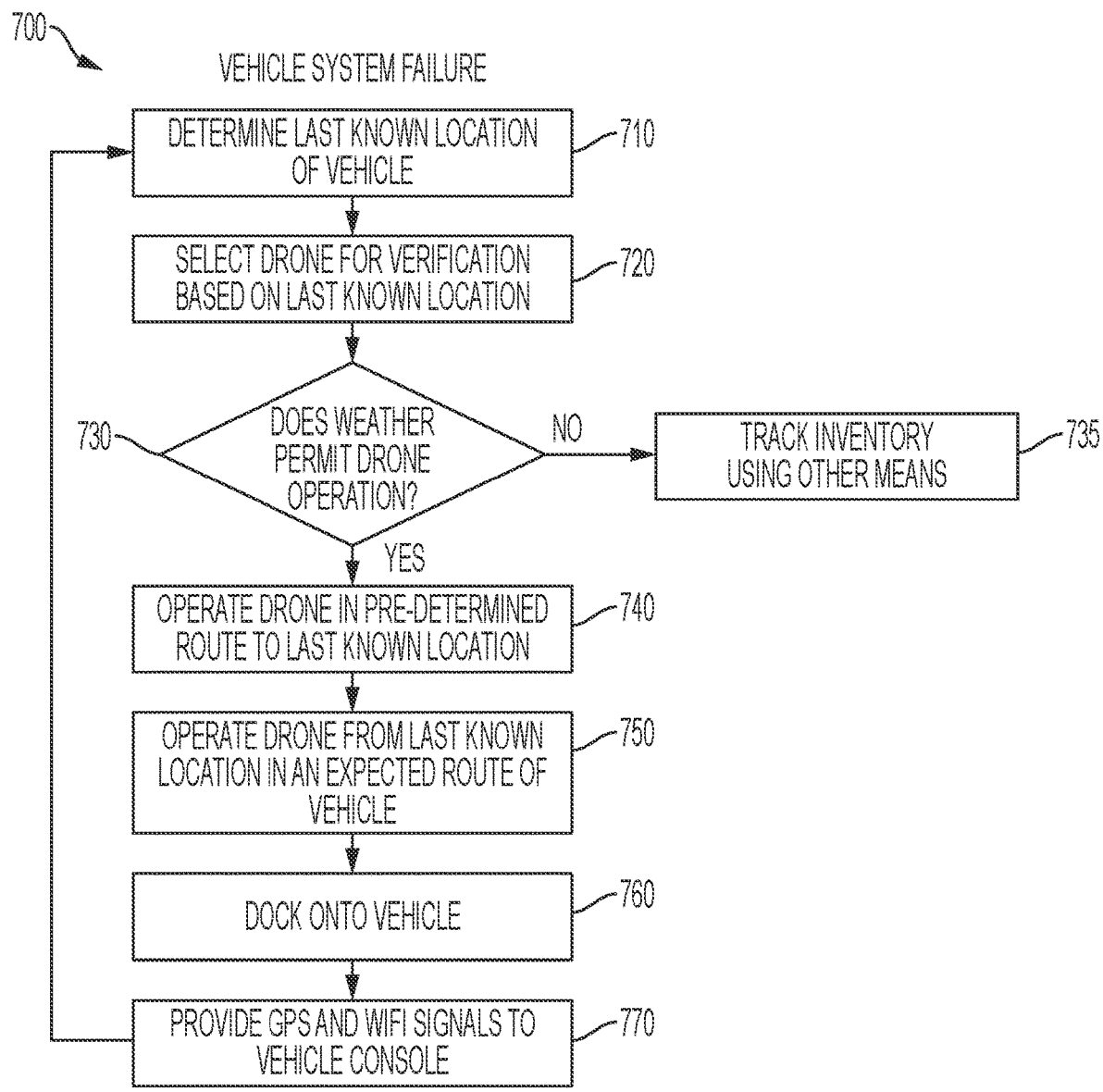
FIG. 9 is a flowchart of a method for vehicle system failure drone dispatch in accordance with some embodiments.

FIG. 9 illustrates a flowchart of an example method 700 for vehicle system failure drone dispatch. In the example illustrated, the method 700 includes determining last known location of a vehicle (at block 710). The steel-making plant may include several manually-operated, semi-autonomous, and autonomous vehicles. In some instances, the vehicle may experience a system failure where the vehicle may lose certain functionality. For example, a GPS system, a communication system, and/or an image capturing system of the vehicle may have failed preventing operation of the vehicle. When the central management server 110 detects a vehicle system failure, the central management server 110 may determine the last known location of the vehicle and may dispatch a drone 130 to provide the missing functionality.

The method 700 includes selecting a drone 130 for verification based on last known location (at block 720). The central management server 110 may select a drone 130 from the drone dock 120 based on several factors. In one example, the central management server 110 selects a drone 130 having sufficient battery charge to complete the operation. In another example, the central management server 110 pre-configures certain drones 130 for specific operations and selects a drone 130 that is configured for providing missing functionality. In some embodiments, the steel-making plant has several drone docks 120 and the central management server 110 selects a drone 130 from a drone dock 120 that is located closest to the last-known location of the vehicle.

The method 700 includes determining whether the weather permits drone operation (at block 730). When the weather conditions are not favorable for drone operation, the central management server 110 may use other means for correcting the inventory discrepancy or may suspend the drone operation until the weather conditions are favorable again (at block 735). When the weather conditions are favorable for drone operation, the method 700 includes operating the drone 130 in a pre-determined route to last known location (at block 740). The central management server 110 may select a pre-determined or pre-planned route for getting from the drone dock 120 to the last known location of the vehicle.

The method 700 includes operating drone 130 from the last known location in an expected route of the vehicle (at block 750). In some instances, the vehicle is moving and/or has moved from a last known location. In these cases, the drone 130 is operated from the last known location in the expected route of the vehicle to determine the current location of the vehicle. The central management server 110 may locate a vehicle based on images captured by the drone 130. In some embodiments, an operator may use the central management server 110 to guide the drone 130 to the vehicle based on the images captured by the drone 130.

The method 700 includes docking onto the vehicle (at block 760). Once the vehicle is located, the drone 130 docks onto the vehicle. The vehicle may include a dock that is similar to the dock 350 of the drone dock 120. The drone 130 may automatically dock onto the vehicle or may be guided by an operator to dock onto the vehicle. In some embodiments, once the drone 130 reaches the last known location or reaches the vehicle, the drone 130 may provide an alert to a user. The user may then remotely control the drone 130 to dock onto the vehicle. The user may also navigate the drone 130 to find the vehicle from the last known location. In some embodiments, when a vehicle experiences a system failure, the vehicle may be navigated to a pre-marked location closest to the last known location. The drone 130 may navigate to the pre-marked location closest to the last known location. The drone 130 may then automatically or manually docked onto the vehicle/

The method 700 includes providing missing functionality to the vehicle console (at block 770). The drone 130 communicates with a console of the vehicle to provide the missing functionality. For example, the drone 130 may provide GPS signals to the vehicle console for route guidance, provide communication capabilities to communicate with the central management server 110, or may provide image capturing functionality to the vehicle.

Thus, the invention provides, among other things, drone-based inventory management methods and systems.

The invention claimed is:

1. A drone-based inventory management system comprising:
one or more unmanned aerial vehicles (UAVs);
a central management server including
a transceiver configured to communicate with the one or more UAVs, and
an electronic processor coupled to the transceiver and configured to
determine an area for inventory tracking;
measure, using a UAV of the one or more UAVs, one of height changes and volume changes of the inventory at each location in the area;
determine change in inventory at each location in the area based on height or volume changes; and
update inventory based on the change in inventory at each location in the area,
determine a discrepancy in inventory,
determine an inventory location associated with the discrepancy in inventory,
capture, using the UAV, images of the area for inventory tracking at different angles of the inventory location, wherein the one of the height changes and the volume changes are measured based on the captured images of the area for inventory tracking, wherein the UAV is selected from the one or more UAVs based on the inventory location
determine new inventory in the area for inventory tracking based on the captured images, and
update inventory based on the new inventory.

2. The system of claim 1, wherein the electronic processor is further configured to:
determine whether weather permits UAV operation, and
operate the UAV in the pre-determined route when the weather permits UAV operation.

3. The system of claim 1, wherein the electronic processor is further configured to
capture, using the UAV, images of the area for inventory tracking,
identify an inventory location and inventory of items present at the inventory location based on the captured images of the area for inventory tracking.

4. The system of claim 3, wherein the electronic processor is further configured to segment the captured images of the area based on locations in the area.

5. The system of claim 4, wherein segmenting images includes adding location tags to the images of the area to correlate the captured images of the area with the locations corresponding to the captured images of the area.

6. The system of claim 1, wherein the pre-determined route includes both an indoor location and an outdoor location.

7. A method for drone-based inventory management, the method comprising:
determining an area for inventory tracking;
measuring, using a UAV of the plurality of UAVs,
one of height changes and volume changes of inventory at each location in the area;
determining change in inventory at each location in the area based on height or volume changes; and
updating inventory based on the change in inventory at each location in the area,
determining a discrepancy in inventory,
determining an inventory location associated with the discrepancy in inventory,
capturing, using the UAV, images of the area for inventory tracking at different angles of the inventory location, wherein the one of the height changes and the volume changes are measured based on the captured images of the area for inventory tracking, wherein the UAV is selected from the one or more UAVs based on the inventory location
determining new inventory in the area for inventory tracking based on the captured images, and
updating inventory based on the new inventory.

8. The method of claim 7, the method further comprising:
determining whether weather permits UAV operation, and
operating the UAV in the pre-determined route when the weather permits UAV operation.

9. The method of claim 7, the method further comprising:
capturing, using the UAV, images of the area for inventory tracking, and
identifying an inventory location and inventory of items present at the inventory location based on the captured images of the area for inventory tracking.

10. The method of claim 9, the method further comprising:
segmenting the captured images of the area based on locations in the area.

11. The method of claim 10, wherein segmenting images includes adding location tags to the images of the area to correlate the captured images of the area with the locations corresponding to the captured images of the area.

12. The method of claim 7, wherein the pre-determined route includes both an indoor location and an outdoor location.

* * * * *